US012541612B2

(12) United States Patent
Vogel et al.

(10) Patent No.: US 12,541,612 B2
(45) Date of Patent: Feb. 3, 2026

(54) IDENTIFYING FORGOTTEN DATA PRIVACY PROTOCOL RELEVANT DATA OBJECTS

(71) Applicant: SAP SE, Walldorf (DE)

(72) Inventors: Matthias Vogel, Saarbrücken (DE); Benny Rolle, Reinhardshagen (DE)

(73) Assignee: SAP SE, Walldorf (DE)

( * ) Notice: Subject to any disclaimer, the term of this patent is extended or adjusted under 35 U.S.C. 154(b) by 40 days.

(21) Appl. No.: 18/487,283

(22) Filed: Oct. 16, 2023

(65) Prior Publication Data

US 2025/0124151 A1 Apr. 17, 2025

(51) Int. Cl.
*G06F 21/62* (2013.01)

(52) U.S. Cl.
CPC .............................. *G06F 21/6218* (2013.01)

(58) Field of Classification Search
CPC .................................................. G06F 21/6218
See application file for complete search history.

(56) References Cited

U.S. PATENT DOCUMENTS

| 17,186 | A | 5/1857 | Atwater |
|---|---|---|---|
| 17,457 | A | 6/1857 | Tidgewell |
| 7,308,704 | B2 | 12/2007 | Vogel et al. |
| 7,350,237 | B2 | 3/2008 | Vogel et al. |
| 8,566,193 | B2 | 10/2013 | Singh et al. |
| 8,874,551 | B2 | 10/2014 | Rosjat et al. |
| 9,149,407 | B2 | 10/2015 | Hesse et al. |
| 9,405,429 | B1 | 8/2016 | Gopalakrishnan |
| 9,569,869 | B2 | 2/2017 | Hesse et al. |
| 9,904,796 | B2 | 2/2018 | Pluder et al. |
| 9,996,592 | B2 | 6/2018 | Hengstler et al. |
| 10,140,453 | B1 | 11/2018 | Fridakis |
| 10,552,642 | B2 | 2/2020 | Rolle et al. |
| 10,839,099 | B2 | 11/2020 | Vogel et al. |
| 10,909,222 | B1 | 2/2021 | Fregly et al. |
| 11,042,654 | B2 | 6/2021 | Nos et al. |
| 11,113,416 | B2 | 9/2021 | Jones et al. |

(Continued)

OTHER PUBLICATIONS

U.S. Appl. No. 18/049,063, Hesse et al., filed Oct. 24, 2022.

(Continued)

*Primary Examiner* — James R Turchen
(74) *Attorney, Agent, or Firm* — Fish & Richardson P.C.

(57) ABSTRACT

The present disclosure involves systems, software, and computer implemented methods for data privacy. One example method includes receiving, from responder applications that participate in but do not initiate a data privacy integration protocol, end-of-purpose information for at least one object. The responders respond to protocol commands for executions of the protocol requested by a requester application. Identifying information for objects can be provided to each requester application in a message to the requester application that requests the requester application to determine whether the requester application currently stores the objects. At least one orphaned object can be identified from information in the responses received from the requester applications. An orphaned object is an object for which a responder application has provided end-of-purpose information but for which no requester application currently stores the object. Execution of the data privacy integration protocol can be triggered for each orphaned object.

20 Claims, 8 Drawing Sheets

800

(56) References Cited

U.S. PATENT DOCUMENTS

| | | |
|---|---|---|
| 11,481,513 B2 | 10/2022 | Rolle |
| 11,494,546 B2 | 11/2022 | Rolle |
| 11,514,065 B2 | 11/2022 | Rolle |
| 11,550,781 B2 | 1/2023 | Rolle et al. |
| 11,657,034 B2 | 5/2023 | Rolle |
| 11,714,828 B2 | 8/2023 | Rolle et al. |
| 11,714,918 B1 | 8/2023 | Kondal et al. |
| 11,741,237 B2 | 8/2023 | Loch et al. |
| 2008/0174425 A1 | 7/2008 | Torning |
| 2009/0210394 A1 | 8/2009 | Saravanan et al. |
| 2009/0288062 A1* | 11/2009 | Lowry .................. G06Q 10/06 717/101 |
| 2012/0036507 A1 | 2/2012 | Jonnala et al. |
| 2012/0246122 A1 | 9/2012 | Short et al. |
| 2013/0055278 A1 | 2/2013 | Zaitsev |
| 2013/0347064 A1 | 12/2013 | Aissi |
| 2014/0059458 A1 | 2/2014 | Levien et al. |
| 2014/0172496 A1 | 6/2014 | Rosjat et al. |
| 2014/0267770 A1 | 9/2014 | Gervautz et al. |
| 2014/0364983 A1 | 12/2014 | Bildmayer et al. |
| 2015/0113459 A1 | 4/2015 | Hengstler et al. |
| 2016/0112438 A1 | 4/2016 | Hengstler et al. |
| 2016/0148143 A1 | 5/2016 | Anderson et al. |
| 2017/0006135 A1 | 1/2017 | Siebel et al. |
| 2017/0270163 A1 | 9/2017 | Christoph et al. |
| 2018/0101164 A1 | 4/2018 | Noetzelmann et al. |
| 2019/0005210 A1 | 1/2019 | Wiederspohn et al. |
| 2019/0018985 A1 | 1/2019 | Rolle et al. |
| 2019/0236334 A1 | 8/2019 | Babushkin |
| 2020/0012978 A1* | 1/2020 | Brannon ............. G06Q 10/067 |
| 2020/0019728 A1 | 1/2020 | Rolle |
| 2020/0117824 A1 | 4/2020 | Upadhyay et al. |
| 2020/0184087 A1 | 6/2020 | Nos et al. |
| 2020/0364369 A1* | 11/2020 | Brannon ................. G06F 21/33 |
| 2021/0200902 A1* | 7/2021 | Brannon ............. G06F 21/6263 |
| 2021/0350022 A1* | 11/2021 | Brannon ................. G06F 40/20 |
| 2022/0035952 A1* | 2/2022 | Brannon ............... G06F 3/0482 |
| 2022/0043917 A1 | 2/2022 | Rolle |
| 2022/0050834 A1 | 2/2022 | Rolle et al. |
| 2022/0121777 A1* | 4/2022 | Brannon ............... G06F 16/909 |
| 2022/0207429 A1 | 6/2022 | Haribhakti et al. |
| 2022/0277023 A1* | 9/2022 | Rolle ..................... G06Q 30/01 |
| 2022/0277103 A1* | 9/2022 | Brannon ............. G06F 21/6245 |
| 2022/0357992 A1 | 11/2022 | Karpovsky et al. |
| 2023/0004546 A1* | 1/2023 | Mounidevy ....... G06F 16/24573 |
| 2023/0081785 A1 | 3/2023 | Zhang |
| 2023/0086609 A1 | 3/2023 | Grenet et al. |
| 2023/0176894 A1 | 6/2023 | Rolle et al. |
| 2023/0177180 A1 | 6/2023 | Rolle |
| 2023/0177182 A1 | 6/2023 | Rolle et al. |
| 2023/0177183 A1 | 6/2023 | Rolle et al. |
| 2023/0177186 A1 | 6/2023 | Ighoroje et al. |
| 2023/0177187 A1 | 6/2023 | Vogel et al. |
| 2023/0177188 A1 | 6/2023 | Vogel et al. |
| 2023/0177189 A1 | 6/2023 | Ighoroje et al. |
| 2023/0177194 A1 | 6/2023 | Rolle et al. |
| 2023/0177206 A1 | 6/2023 | Rolle et al. |
| 2023/0177213 A1* | 6/2023 | Rolle .................... G06F 16/113 726/1 |
| 2023/0179602 A1 | 6/2023 | Rolle et al. |
| 2023/0185938 A1 | 6/2023 | Schmidt et al. |
| 2023/0214521 A1 | 7/2023 | Amico |
| 2023/0247034 A1 | 8/2023 | Vogel et al. |
| 2024/0184895 A1 | 6/2024 | Vogel et al. |
| 2024/0356900 A1 | 10/2024 | Wang et al. |
| 2024/0386106 A1 | 11/2024 | Sethia et al. |
| 2024/0427899 A1* | 12/2024 | Hulick, Jr. ............ G06F 21/577 |
| 2025/0013602 A1 | 1/2025 | Hesse et al. |
| 2025/0013778 A1 | 1/2025 | Rolle et al. |
| 2025/0123854 A1 | 4/2025 | Rolle et al. |
| 2025/0124051 A1 | 4/2025 | Rolle et al. |
| 2025/0124160 A1 | 4/2025 | Rolle et al. |

OTHER PUBLICATIONS

U.S. Appl. No. 18/073,142, Rolle, filed Dec. 1, 2022.
U.S. Appl. No. 18/073,164, Rolle et al., filed Dec. 1, 2022.
U.S. Appl. No. 18/074,745, Vogel et al., filed Dec. 5, 2022.
U.S. Appl. No. 18/077,476, Rolle et al., filed Dec. 8, 2022.
U.S. Appl. No. 18/077,493, Rolle et al., filed Dec. 8, 2022.
U.S. Appl. No. 18/347,029, Rolle et al., filed Jul. 5, 2023.
U.S. Appl. No. 18/347,065, Hesse et al., filed Jul. 5, 2023.
Sap.com [online], "SAP Master Data Governance" Sep. 2022, retrieved on Oct. 16, 2023, retrieved from URL <https://www.sap.com/products/technology-platform/master-data-governance.html>, 14 pages.
U.S. Appl. No. 18/487,293, Rolle et al., Automating Handling of Data Subject Requests for Data Privacy Integration Protocols, filed Oct. 16, 2023, 51 pages.
U.S. Appl. No. 18/487,347, Rolle et al., Semantic Responder Dependencies in Integrated End of Purpose Protocols, filed Oct. 16, 2023, 56 pages.
U.S. Appl. No. 18/487,365, Rolle et al., Landscape Reconfiguration Based on Cross-System Data Stocktaking, filed Oct. 16, 2023, 65 pages.
Non-Final Office Action in U.S. Appl. No. 18/487,365, mailed on Apr. 1, 2025, 15 pages.
Wikipedia.org [online] "Attribute-value system" created on Oct. 2006, retrieved on Oct. 17, 2023, retrieved from URL <https://en.wikipedia.org/wiki/Attribute%E2%80%93value_system>, 3 pages.
Wikipedia.org [online], "Hash function" created on Sep. 2001, retrieved on Oct. 17, 2023, retrieved from URL <https://en.wikipedia.org/wiki/Hash_function>, 15 pages.
Wikipedia.org [online], "Information privacy" created on May 2003, retrieved on Dec. 6, 2021, retrieved from URL <https://en.wikipedia.org/wiki/Information_privacy>, 7 pages.
Wikipedia.org [online], "Master Data" created on Oct. 2006, retrieved on Dec. 6, 2021, retrieved from URL <https://en.wikipedia.org/wiki/Master_data>, 2 pages.
Wikipedia.org [online], "Personal Data" created on May 2005, retrieved on Dec. 6, 2021, retrieved from URL <https://en.wikipedia.org/wiki/Personal_data>, 7 pages.

* cited by examiner

IDENTIFYING FORGOTTEN DATA PRIVACY PROTOCOL RELEVANT DATA OBJECTS

TECHNICAL FIELD

The present disclosure relates to computer-implemented methods, software, and systems for data privacy protocols.

BACKGROUND

Applications used for organizations can use master data (such as name and address) and transactional data (such as orders and bills). Transactional data typically references corresponding master data. For instance, a transactional object of type Order can refer to a master data object of type Customer. A given master data object can be referenced by one or more (or perhaps no) transactional objects. In some cases, data may be considered master data in one context and transactional data in another context. For example, insurance contract data may be considered transactional data with respect to a customer object but considered master data with respect to transactional insurance claim data. When an organizational landscape includes multiple systems, a master data replication process can be performed so that master data objects are consistent across systems.

SUMMARY

The present disclosure involves systems, software, and computer implemented methods for data privacy protocols. An example method includes: receiving, from at least one responder application that participates in a data privacy integration protocol, end-of-purpose information for at least one object, wherein the at least one responder application responds to data privacy integration protocol commands for executions of a data privacy integration protocol requested by a requester application without initiating the executions of the data privacy integration protocol; identifying, for each object of the at least one object, requester applications that are configured to initiate executions of the data privacy integration protocol for the object; providing, for each object of the at least one object, identifying information for the object to each requester application of the requester applications in a message to the requester application that requests the requester application to determine whether the requester application currently stores the object; receiving, as received responses, for each object of the at least one object and from each requester application, a response to the message that indicates whether the requester application currently stores the object; identifying, from information in the received responses from the requester applications, at least one orphaned object for which a responder application has provided end-of-purpose information but for which no requester application currently stores the object; and taking action for each orphaned object of the at least one orphaned object that triggers an execution of the data privacy integration protocol for the orphaned object.

Implementations can include one or more of the following features. The data privacy integration protocol can be an integrated end of purpose protocol, and the end-of-purpose information for an object for a responder application can indicate whether the responder application can block the object. The data privacy integration protocol can be an aligned purpose disassociation protocol, and the end-of-purpose information for an object for a responder application can indicate whether the responder application can disassociate a purpose from the object. The at least one orphaned object can include a first object that was deleted from a first requester application outside of the data privacy integration protocol. The at least one orphaned object can include a first object for which replication of the first object to a first requester application failed to occur. Taking action for an orphaned object can include creating a ticket that includes the orphaned object for initiating the data privacy integration protocol and executing the data privacy integration protocol for the orphaned object in response to creation of the ticket. Executing the data privacy integration protocol for the orphaned object can result in blocking of the orphaned object in the responder application that provided end-of-purpose information for the orphaned object. Executing the data privacy integration protocol for the orphaned object can result in a first purpose being disassociated from the orphaned object in the responder application that provided end-of-purpose information for the orphaned object. Taking action for an orphaned object can include receiving a data privacy integration protocol ticket that includes the orphaned object from a first requester application. The first requester application can create the data privacy integration protocol ticket in response to receiving the message and determining that the first requester application does not store the orphaned object. Before receiving the end-of-purpose information, an instruction can be sent to the at least one responder application that requests each responder application to determine end-of-purpose information for the at least one object. The instruction can include a wildcard parameter that is interpreted by a responder application as corresponding to all objects stored by the responder application. A determination can be made, based on registration information for a first responder application and a second responder application, to send the instruction to the first responder application and to not send the instruction to the second responder application. The instruction can be automatically sent to the at least one responder application on a periodic basis. The instruction can be sent to the at least one responder application in response to receiving an administrator request to send the instruction. The end-of-purpose information can be sent by the at least one responder application in response to each responder application determining to generate and send the end-of-purpose information. Various processing can be performed in response to receiving first end-of-purpose information from a first responder application for a first object and instead of sending the message to requester applications. For example, a ticket can be created for the data privacy integration protocol that includes the first object. The data privacy integration protocol can be executed in response to creating the ticket, and executing the data privacy integration protocol can include sending a data privacy integration protocol instruction to the requester applications and sending the data privacy integration protocol instruction to the at least one responder application only if each requester application has reached end-of-purpose for the first object.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
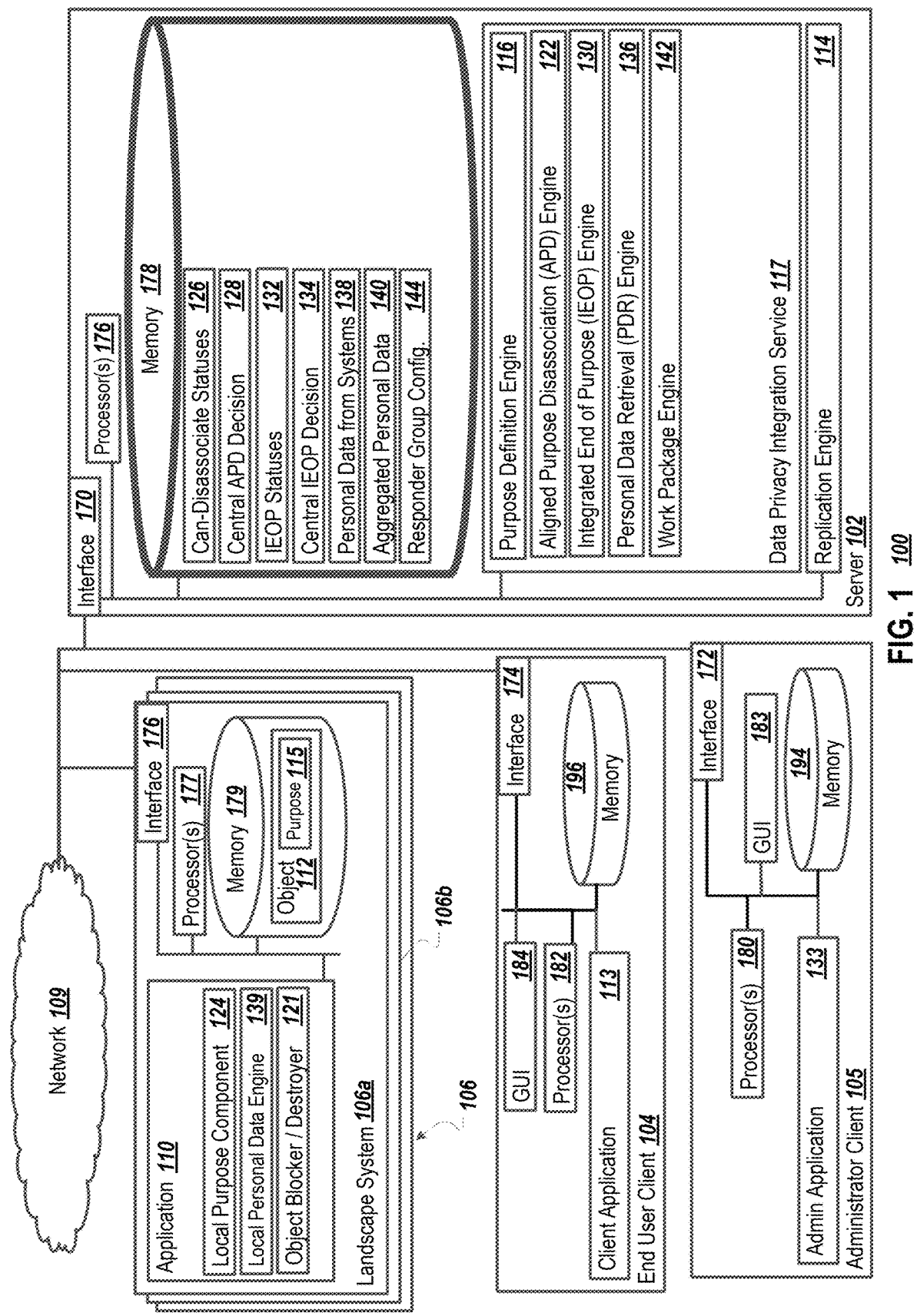
FIG. 1 is a block diagram illustrating an example system for integrated data privacy services.

An integrated multiple-application landscape can include a data privacy integration (DPI) service that provides various functions for integrating personal data related capabilities of different applications. For example, the DPI service can include protocols related to integrated end-of-purpose processing, integrated personal data retrieval, aligned purpose disassociation, and other protocols. An integrated end-of-purpose protocol can be used to aligned different applications on a point in time when personal data should be blocked from further processing. An integrated personal data retrieval protocol can be used to manage receiving exports of personal data from various applications, so that a common report including personal data concerning a same data subject (e.g., natural person, individual) from multiple applications can be generated. An aligned purpose disassociation protocol can be used to align various applications on when a purpose assignment is removed from a data object. The various DPI protocols can be used on-premise and/or in cloud environments, and can be designed as asynchronous protocols using asynchronous communication between the DPI service and the various applications.

The integrated end-of-purpose, integrated personal data retrieval, and aligned purpose disassociation protocols are described in more detail in U.S. patent application Ser. No. 17/457,797, filed on Dec. 6, 2021 entitled "INTEGRATED END-OF-PURPOSE PROTOCOL FOR MULTIPLE APPLICATIONS", U.S. patent application Ser. No. 17/457,811, filed on Dec. 6, 2021 entitled "INTEGRATED PERSONAL DATA RETRIEVAL ACROSS MULTIPLE APPLICATIONS", and U.S. patent application Ser. No. 17/457,802, filed on Dec. 6, 2021 entitled "ALIGNED PURPOSE DISASSOCIATION PROTOCOL FOR MULTIPLE APPLICATIONS", respectively, the entire contents of each of which are hereby incorporated by reference.

Applications may expend a non-trivial amount of resources responding to requests from the DPI service. Different approaches can be used to reduce resource consumption. For example, applications can be grouped into what can be referred to as responder groups, where the DPI service asks applications in different responder groups, in turn, to respond to a request. Applications can be grouped according to a resource-reduction strategy. For example, applications that are more likely to provide a veto vote (e.g., cannot-block, cannot-disassociate purpose) can be put into earlier responder groups, to reduce a likelihood of other applications unnecessarily performing integrated end-of-purpose or aligned purpose disassociation processing, respectively. Other examples include putting applications that are more likely to fail a block operation in earlier responder groups, or putting applications that are likely to expend more resources responding to a request in a later responder group. Responder groups are described in more detail in U.S. patent application Ser. No. 17/718,770, filed on Apr. 12, 2022 entitled "DATA PRIVACY INTEGRATION SERVICES PROCESSING USING MULTIPLE WORK PACKAGES AND MULTIPLE RESPONDER GROUPS", the entire contents of which are hereby incorporated by reference.

Data privacy integration protocols, such as iEoP or APD, can involve applications in different roles. For instance, an application that participates in a DPI protocol may have a role of a requester or a responder (or both). For example, a first application may be configured as participating in the iEoP protocol as a requester. Accordingly, the first application can request the creation of tickets that result in the DPI service orchestrating the data privacy protocol so that the DPI service aligns with responder applications (e.g., "responders") whether a certain master data object can be blocked from the point of view of all relevant applications. The first application and a second application may be configured as being a responder, for example.

However, inconsistencies can occur in some situations. For instance, a DPI protocol may be configured in the landscape so that only applications that are configured as being a requester can initiate a DPI protocol ticket for an object. However, if no requester applications have a copy of an object (but at least one responder has a copy of the object), the DPI protocol may never be executed for the object, since no requester will create a ticket for the object. Responder(s) may have a copy of an object without any requesters having a copy of the object, as the object may be object being destroyed locally in one or more requesters without aligning with a DPI service. For example, the object may have been deleted manually by an administrator (e.g., accidentally or by an administrator not considering aligning with the DPI service). As another example, a technical error (e.g., in an application or a replication service) may cause the object to be deleted from the requester (or to not be received by the requester). Other situations may cause an object to be deleted from all requesters. An object that is stored only in responder(s) systems may be considered or referred to as a forgotten, or orphaned object, with respect to DPI protocols.

Once a situation occurs in which at least one responder has an object but no requesters have the object, the system is in an inconsistent state in which creation of a DPI ticket that orchestrates aligned blocking of the object may not occur in the landscape. If the object corresponds to personal data (e.g., a master data object that stores personal data), a data controller of the landscape may be noncompliant with respect to data privacy regulations. Additionally, technical inefficiencies can occur, due to consuming storage or other computing resources by storing objects indefinitely.

To solve these legal and technical problems, DPI processing in the landscape can be configured to identify and solve situations in which a responder application that was not set up as a requester in a data privacy integration protocol processes a master data object that is not processed by any requesters, to avoid a situation in which the responder never stops storing this object in an unblocked state (e.g., because the responder would never receive a block instruction from the DPI service, due to the DPI service never receiving a ticket for the object from any requester). As described in detail below, various approaches can be utilized to identify and handle a forgotten or orphaned object so that at some point the object is processed according to DPI protocols (e.g., and eventually deleted from applications in the landscape (e.g., when an aligned end of purpose is reached for the object across all applications)).

The solutions described herein enable data privacy protocols that are integrated with and used across a suite of applications in a landscape to identify objects that would otherwise never be blocked because all configured requesters would not subsequently initiate a data privacy integration ticket for the objects. Identifying such forgotten or orphaned objects can increase a level of compliance of data controllers with data protection legislation. Additionally, technical resources, such as data storage, can be freed up for other useful purposes.

FIG. 1 is a block diagram illustrating an example system 100 for integrated data privacy services. Specifically, the illustrated system 100 includes or is communicably coupled with a server 102, an end-user client device 104, an administrator client device 105, landscape systems 106 (e.g., including a landscape system 106a and a landscape system 106b), and a network 108. Although shown separately, in some implementations, functionality of two or more systems or servers may be provided by a single system or server. In some implementations, the functionality of one illustrated system, server, or component may be provided by multiple systems, servers, or components, respectively. For example, the server 102 includes different engines which may or may not be provided by a single system or server. Furthermore, although the system 100 is illustrated as being configured for handling operations for one organization, the server 102 and included components are configured to handle operations for multiple organizations (e.g., in a multi-tenant fashion). For instance, each organization may be a customer of a software provider that provides the server 102 (and other servers) and implementations of component included in the server 102. The software provider can also provide at least some of the landscape systems 106, which can each also have multi-tenant architectures.

The landscape systems 106 can include multiple systems that exist in a multi-system landscape. An organization can use different systems, of different types, to run the organization, for example. Other types of systems can be used to provide services for end users. The landscape systems 106 can include systems from a same vendor (e.g., the software provider mentioned above) or different vendors. The landscape systems 106 can each include at least one application 110 for performing organizational processes and working with organizational data. Organizational data can include master data objects and transactional objects. For example, the application 110 can process a master data object 112. An end user of the organization can use a client application 113 (which may be a client version of the application 110) on the end-user client device 104 to consume and/or interact with landscape data, including information from the master data object 112. Regarding the handling of master data objects, various best practices can be applied by an organization. For example, the system 100 can be configured so that corresponding master data objects are consistent across all landscape systems 106. For instance, a replication engine 114 can distribute master data to at least some of the landscape systems 106 so that each application 110 that acts on certain master data can perform processing on the same consistent master data. As described in more detail below, an administrator of the organization can use the administrator client device 105 to perform various administration and/or configuration tasks to configure the landscape systems 106 and/or other tools included in the server 102 (or other servers or systems).

For example, various data protection rules and laws may require that data is only processed for specified purposes. The system 100 can implement a purpose requirement by associating purpose information with each object instance (or portion of an object instance). For example, a purpose 115 has been associated with the master data object 112. A purpose definition engine 116 can be included in a DPI service 117 to enable customers to define purposes for processing personal data that are relevant for the customer. Defined purposes can be stored as purposes 118. A purpose 118 can be associated with data categories 120. An administrator can assign one or more data categories 120 to a purpose 118 to specify which of potentially different attribute sets stored for a data object can be used when data for the purpose 118 is processed.

The landscape system 106 can receive the master data object 112 and the associated purpose 115 from the replication engine 114, for example. The DPI service 117 can determine which applications process objects for which purposes. The replication engine 114 can replicate an object with an assigned purpose to a given landscape system 106 when the landscape system 106 processes objects for that purpose. Purpose-based processing can be performed in the landscape system 106, as described in more detail below.

Objects that no longer have any associated productive purposes can be put into a blocked state for a period of time, in accordance with one or more non-productive purposes, for instance by an object blocker/destroyer 121, before being deleted. For instance, while an object instance with no attached purposes may no longer be used for transactions or have any need to be accessed by production systems, the object can be maintained, in a blocked state, for a certain number of days or years, to enable auditing, for example. An authorized service, such as an audit service, may be enabled to access the blocked object, but other production applications or services can be prevented from accessing the blocked object. As another example, for an application that provides both productive functionality and audit functionality, the audit portion of the application can access blocked data but the productive portion of the application cannot access blocked data.

As part of an aligned purpose disassociation (APD) approach, the landscape systems 106 can disassociate a purpose with an object in response to information received from an aligned purpose disassociation engine 122 of the DPI service 117, rather than solely based on a local decision. For example, each landscape system 106 can provide information to the aligned purpose disassociation engine 122. For example, a local purpose component 124 in each landscape system 106 can determine, for each purpose of an object, whether the purpose can be locally disassociated from the object. In some cases, the local purpose component 124 can determine, without consulting other systems, whether a purpose can be locally disassociated from the object. In other cases, the local purpose component 124 may consult other system(s) when performing the local check. For example, if a first system is integrated with a second system and exchanges data with the second system, but the second system is not integrated with the APD protocol, the first system may contact the second system and consider the status of the second system as part of a local status of the first system for the APD protocol. As another example, the second system may be integrated with the APD protocol but the first system may know that specific circumstances within the second system are relevant for the local status of the first system. For example, the first system may know that a purpose that cannot be disassociated from data within the second system may result in the purpose not being able to be disassociated in the first system. As an example, suppose the first system collects expense information that is transferred to the second system and posted as financial data in the second system. The first system may be integrated with the second system (e.g., before the systems became integrated with the APD protocol) in such a way that the first system can ask the second system whether a purpose can be disassociated from the data.

For example, each landscape system 106 can determine a "can-disassociate" status for a requested purpose and object. A can-disassociate status for a respective landscape system 106 can be either an affirmative can-disassociate status that indicates that the landscape system 106 can disassociate a purpose from an object or a negative can-disassociate status that indicates that the landscape system 106 cannot disassociate the purpose from the object. The aligned purpose disassociation engine 122 can collect received can-disassociate statuses 126. The aligned purpose disassociation engine 122 can evaluate the can-disassociate statuses 126 to determine a central aligned disassociate purpose decision 128 regarding disassociating a purpose from an object. The aligned purpose disassociation engine 122 can determine that the central aligned disassociate purpose decision 128 is to disassociate the purpose from the object if no landscape system 106 is unable to disassociate the purpose from the object. The aligned purpose disassociation engine 122 can determine that the central aligned disassociate purpose decision 128 is to not disassociate the purpose from the object if at least one landscape system 106 is unable to disassociate the purpose from the object. The aligned purpose disassociation engine 122 can provide the central aligned disassociate purpose decision 128 to each landscape system 106. The local purpose component 124 can disassociate the purpose from the object in response to receiving the central aligned disassociate purpose decision 128, if the central aligned disassociate purpose decision 128 is in fact to disassociate the purpose from the object.

The object blocker/destroyer 121 can block an object (e.g., from all production processing) when no productive purposes are associated with the object (e.g., after all productive purposes have been disassociated), according to one or more retention policies. An object can be blocked, rather than destroyed, if one or more retention policies associated with one or more non-productive purposes state that the object is to be maintained for access, outside of productive processing, only by authorized users. The object blocker/destroyer 121 can determine to destroy a blocked object in response to determining that all applicable retention reasons have expired. Object destruction decisions and actions can occur locally and independently in each landscape system 106. For example, each application 110 can determine locally whether a blocked object is to be destroyed. For instance, the application 110 can determine to destroy an object (e.g., a master data object) when no purposes are associated with the object, no transactional data references the object, and no retention policy currently applies to the object. In response to an object destruction decision, the object blocker/destroyer 121 can destroy the object. As described below, object blocking can be aligned across systems, so that, e.g. master data is blocked in all systems at substantially a same point in time to ensure that a first system does not create new transactional data referencing the master data where the new transactional data is replicated to a second system in which the master data had already been blocked.

In some implementations, an iEoP (Integrated End of Purpose) engine 130 of the DPI service 117 is used instead of or in addition to the APD engine 122. The iEoP engine 130 can send EoP queries to each landscape system 106 and receive EoP statuses 132 from the local purpose components 124 of different landscape systems regarding ability to block or delete a particular master data object. The iEoP engine 130 can evaluate the EoP statuses 132 to generate a central EOP decision 134. If a consensus is reached regarding ability to block an object, the iEoP engine 130 can distribute aligned block commands to trigger an aligned blocking of the object across the landscape systems 106. The iEoP engine 130 can also orchestrate integrated unblocking, when unblocking is required due to blocking failure in one or more systems, or for other reasons.

As mentioned, a data subject can have a right to request personal data stored associated with the data subject. The data subject (or the data controller, on behalf of the data subject) can initiate a personal data request from any of the landscape systems 106. For example, the data subject may submit a request using a user interface of the client application 113, with the request being received by the application 110 that handles requests from the client application 113. The application 110 can forward the request to a personal data retrieval (PDR) engine 136 of the DPI service 117. Accordingly, any application within the landscape that is integrated with the DPI service 117 can request a report that, when generated, includes personal data automatically obtained by the DPI service from all of the other applications in the landscape. The data subject, therefore, can trigger a personal data request, in any one of the applications, rather than having to request from all of the applications. The PDR engine 136 automatically requests and receives personal data 138 from respective local personal data engines 139 in different landscape systems 106. The PDR engine 136 then creates aggregated personal data 140 and provides the aggregated personal data 140 to the data subject in response to the request, as a unified and uniform data report. In addition to the APD engine 122, the iEoP engine 130, and the PDR engine 136, the DPI service 117 can include or provide other data privacy integration services.

A work package engine 142 can be used to split requests into multiple work packages. As mentioned above, the DPI service 117 can send requests (e.g., work packages) to applications according to responder group configurations 144.

As mentioned, each landscape system 106 can participate in DPI protocols as a requester (e.g., creating DPI tickets) and/or as a responder (e.g., responding to DPI requests). For example, suppose the landscape system 106a is configured as a responder for the iEoP protocol but not as a requester, for the object type of the object 112. As another example, the landscape system 106b may be configured as a requester for the iEoP protocol for the object type of the object 112 (and may also be able to participate as a responder, responding to DPI messages sent in response to a ticket initiated by another landscape system 106 (or by the landscape system 106b itself).

As discussed above, the landscape system 106a, as a responder system/application, may store the object 112 at a time when no requester (e.g., neither the landscape system 106b nor any other requester) has (e.g., stores) a copy of the object 112. For example, the landscape system 106b may have been the only requester that initially had a copy of the object 112, and an administrator may have deleted the copy of the object 112 from the landscape system 106b. As another example, a misconfiguration involving the replication engine 114 may have resulted in the landscape system 106b not receiving a copy of the object 112 as may have been intended. Other factors may create a situation in which responder(s) have a copy of the object 112 without any requesters having a copy of the object 112. For instance, as an unlikely but possible scenario, the system 100 may not include any requesters for a particular object type. In any of these situations, the object 112 can then be considered as a "forgotten" or orphaned object.

Different approaches can be used to identify and handle forgotten/orphaned objects. For example, the DPI service 117 can receive end-of-purpose information for the object 112 from the landscape system 106a. For instance, the landscape system 106a can be configured to determine, internally, to send the end-of-purpose information (e.g., periodically, in response to an event, or based on some other condition) for the object 112 to the DPI service 117. As another example, the DPI service 117 can send an instruction to the landscape system 106a that requests the landscape system 106a to determine end-of-purpose information for objects stored in the landscape system 106a. The instruction may be automatically sent by the DPI service 117 to the landscape system 106a (and to other responder systems/applications) on a periodic basis or in response to receiving an administrator request to send the instruction. The instruction can include a wildcard parameter (e.g., in a work package generated by the work package engine 142) that is interpreted by the landscape system 106a as a request for end-of-purpose information for all objects stored by the landscape system 106b.

In response to receiving the end-of-purpose information for the object 112 from the landscape system 106a, the DPI service 117 can identify requester systems/applications that participate in a DPI protocol in a requester mode for the object 112 (or the type of the object 112). For instance, the DPI service 117 can identify the landscape system 106b as a requester. The DPI service 117 can send an object identifier of the object 112 in a message to the landscape system 106b that requests the landscape system 106b to determine whether the landscape system 106b currently stores the object. The landscape system 106b can respond to the message (e.g., indicating that the landscape system 106b does not store a copy of the object 112). The DPI service 117 may receive similar responses from other requesters. The DPI service 117 can evaluate the responses from requesters and may determine that the object 112 is a forgotten/orphaned object for which a responder system/application has provided end-of-purpose information but for which no requester system/application currently stores the object. As another example, the DPI service 117 may know that for an object type of the object 112, no requesters are currently configured for the object 112.

As described in more detail below with respect to FIGS. 4 to 8, action can be taken for the object 112 (and each other forgotten/orphaned object) that triggers an execution of the data privacy integration protocol (e.g., iEoP, APD) for the orphaned object. For example, the DPI service 117 can, in response to evaluating the responses from requester applications, create a ticket for initiating the data privacy integration protocol that includes the forgotten/orphaned object and execute the data privacy integration protocol for the forgotten/orphaned object in response to creation of the ticket. Executing the data privacy integration protocol for the object 112 can result in eventual blocking of the object 112 in the landscape system 106a, for example, as part of the iEoP protocol. In some implementations, a requester system/application such as the landscape system 106b can create the data privacy integration protocol ticket for the object 112 in response to determining that the landscape system 106b does not store a copy of the object 112.

In some cases, the DPI service 117 does not send a message to requester systems/applications such as the landscape system 106b in response to receiving end-of-purpose information for the object 112 from the landscape system 106a. In such implementations, the DPI service 117 can create a ticket for the data privacy integration protocol that includes the object 112 without requesting information from requester systems/applications. The DPI service 117 can execute the data privacy integration protocol in response to creating the ticket, which can include sending a data privacy integration protocol instruction to the requester systems/applications (e.g., by using a first responder group) and sending the data privacy integration protocol instruction to the at least one responder application (e.g., using later responder groups) only if each requester application has reached end-of-purpose for the first object.

The solutions described above can avoid disadvantages of other potential solutions. For instance, one potential solution is configuring every landscape system 106 as a requester for every object type. However, making every landscape system 106 a requester for every object type is not practicable and introduces multiple disadvantages. For instance, a first disadvantage can be that every landscape system 106 would be required to implement technical features of being a requester (e.g., to be able to create tickets), which may not be desirable for every developer/provider of landscape systems. A second disadvantage can be in losing a separation of concerns design aspect of the landscape. For instance, for some landscapes or scenarios, one or more applications may naturally be requesters and other applications may naturally be responders. For instance, in some scenarios, a human resources (HR) system may naturally be a requester and different microservices that use the HR system may naturally be responders, and an unnatural design may occur if configuring each microservice as a requester. A third disadvantage can be that if every system is a requester, an increase in protocol processing costs may occur due to useless tickets being created by applications that may not be considered important for certain scenarios. For instance, one application normally (e.g., previously) configured as a requester may be a natural leading system and may be configured to trigger an iEoP protocol when that system knows it has reached end-of-purpose for an object. Before that leading system has reached end-of-purpose for the object, creation of tickets by other applications that are now configured as requesters may involve unnecessary runs of the protocol, since the leading system will raise a veto vote. A fourth disadvantage can be that security personnel or designers would not agree with having important capability such as requesting object blocking or deletion being available in every application. A design goal may be to limit capability of triggering processes to block master data objects to a small number of entry points, for easier and more secure configuration, monitoring, and troubleshooting, for example.

Another potential solution would be to utilize the replication engine 114, to avoid deletion of an object in a requesting application without knowledge of other systems in the landscape. For instance, the landscape system 106b, as a requester, can be configured as an upstream application with respect to the replication engine 114, so that the replication engine 114 receives deletion information when an object is deleted from the landscape system 106b, such that the deletion information is forwarded to other landscape systems 106, including the landscape system 106a (who may be a responder for an object type of the object that was deleted). The landscape system 106a can therefore proceed to delete the object. However, this potential solution also has multiple disadvantages. In particular, the various advantages of different DPI protocols such as iEoP and APD, including aligning for deletion, avoiding process interruption, and respecting retention times, would be lost. Additionally, each requester would need to be configured as an upstream application to the replication engine 114, which may not be desired (or possible, in some situations). Furthermore, this potential solution would prove faulty (or undesirable, due to further required technical changes) if some systems utilize replication other than with the replication engine 114.

As used in the present disclosure, the term "computer" is intended to encompass any suitable processing device. For example, although FIG. 1 illustrates a single server 102, a single end-user client device 104, a single administrator client device 105, the system 100 can be implemented using a single, stand-alone computing device, two or more servers 102, or multiple client devices. Indeed, the server 102 and the client devices 104 and 105 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server 102 and the client devices 104 and 105 may be adapted to execute any operating system or runtime environment, including Linux, UNIX, Windows, Mac OS®, Java™, Android™, iOS, BSD (Berkeley Software Distribution) or any other suitable operating system. According to one implementation, the server 102 may also include or be communicably coupled with an e-mail server, a Web server, a caching server, a streaming data server, and/or other suitable server.

Interfaces 170, 172, 173, and 174 are used by the server 102, the end-user client device 104, the landscape system 106a, and the administrator client device 105, respectively, for communicating with other systems in a distributed environment—including within the system 100—connected to the network 108. Generally, the interfaces 170, 172, 173, and 174 each comprise logic encoded in software and/or hardware in a suitable combination and operable to communicate with the network 108. More specifically, the interfaces 170, 172, 173, and 174 may each comprise software supporting one or more communication protocols associated with communications such that the network 108 or interface's hardware is operable to communicate physical signals within and outside of the illustrated system 100.

The server 102 includes one or more processors 176. Each processor 176 may be a central processing unit (CPU), a blade, an application specific integrated circuit (ASIC), a field-programmable gate array (FPGA), or another suitable component. Generally, each processor 176 executes instructions and manipulates data to perform the operations of the server 102. Specifically, each processor 176 executes the functionality required to receive and respond to requests from the end-user client device 104, for example. Similarly, each landscape system 106 includes one or more processors 177. Each processor 177. Each processor 177 executes instructions and manipulates data to perform the operations of the respective landscape system 106.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, ABAP (Advanced Business Application Programming), ABAP OO (Object Oriented), any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 102 includes memory 178. In some implementations, the server 102 includes multiple memories. The memory 178 may include any type of memory or database module and may take the form of volatile and/or non-volatile memory including, without limitation, magnetic media, optical media, random access memory (RAM), read-only memory (ROM), removable media, or any other suitable local or remote memory component. The memory 178 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the server 102. Similarly, each landscape system 106 includes memory 179. The memory 179 may store various objects or data associated with the purposes of the landscape system 106.

The end-user client device 104 and the administrator client device 105 may each be any computing device operable to connect to or communicate in the network(s) 108 using a wireline or wireless connection. In general, each of the end-user client device 104 and the administrator client device 105 comprises an electronic computer device operable to receive, transmit, process, and store any appropriate data associated with the system 100 of FIG. 1. Each of the end-user client device 104 and the administrator client device 105 can include one or more client applications, including the client application 113 or an administrative application 133, respectively. A client application is any type of application that allows a client device to request and view content on the client device. In some implementations, a client application can use parameters, metadata, and other information received at launch to access a particular set of data from the server 102. In some instances, a client application may be an agent or client-side version of the one or more enterprise applications running on an enterprise server (not shown).

The client device 104 and the administrator client device 105 respectively include processor(s) 180 or processor(s) 182. Each processor 180 or 182 included in the end-user client device 104 or the administrator client device 105 may be a central processing unit (CPU), an application specific integrated circuit (ASIC), a field-programmable gate array (FPGA), or another suitable component. Generally, each processor 180 or 182 included in the end-user client device 104 or the administrator client device 105 executes instructions and manipulates data to perform the operations of the end-user client device 104 or the administrator client device 105, respectively. Specifically, each processor 180 or 182 included in the end-user client device 104 or the administrator client device 105 executes the functionality required to send requests to the server 102 and to receive and process responses from the server 102.

Each of the end-user client device 104 and the administrator client device 105 is generally intended to encompass any client computing device such as a laptop/notebook computer, wireless data port, smart phone, personal data assistant (PDA), tablet computing device, one or more processors within these devices, or any other suitable processing device. For example, the end-user client device 104 and/or the administrator client device 105 may comprise a computer that includes an input device, such as a keypad, touch screen, or other device that can accept user information, and an output device that conveys information associated with the operation of the server 102, or the client device itself, including digital data, visual information, or a GUI 183 or a GUI 184, respectively.

The GUI 183 and the GUI 184 each interface with at least a portion of the system 100 for any suitable purpose, including generating a visual representation of the client application 113 or the administrative application 133, respectively. In particular, the GUI 183 and the GUI 184 may each be used to view and navigate various Web pages. Generally, the GUI 183 and the GUI 184 each provide the user with an efficient and user-friendly presentation of business data provided by or communicated within the system. The GUI 183 and the GUI 184 may each comprise a plurality of customizable frames or views having interactive fields, pull-down lists, and buttons operated by the user. The GUI 183 and the GUI 184 each contemplate any suitable graphical user interface, such as a combination of a generic web browser, intelligent engine, and command line interface (CLI) that processes information and efficiently presents the results to the user visually.

Memory 194 and memory 196 respectively included in the end-user client device 104 or the administrator client device 105 may each include any memory or database module and may take the form of volatile or non-volatile memory including, without limitation, magnetic media, optical media, random access memory (RAM), read-only memory (ROM), removable media, or any other suitable local or remote memory component. The memory 194 and the memory 196 may each store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the respective client device.

There may be any number of end-user client devices 104 and administrative client devices 105 associated with, or external to, the system 100. Additionally, there may also be one or more additional client devices external to the illustrated portion of system 100 that are capable of interacting with the system 100 via the network(s) 108. Further, the term "client," "client device," and "user" may be used interchangeably as appropriate without departing from the scope of this disclosure. Moreover, while client device may be described in terms of being used by a single user, this disclosure contemplates that many users may use one computer, or that one user may use multiple computers.

Figure 2:
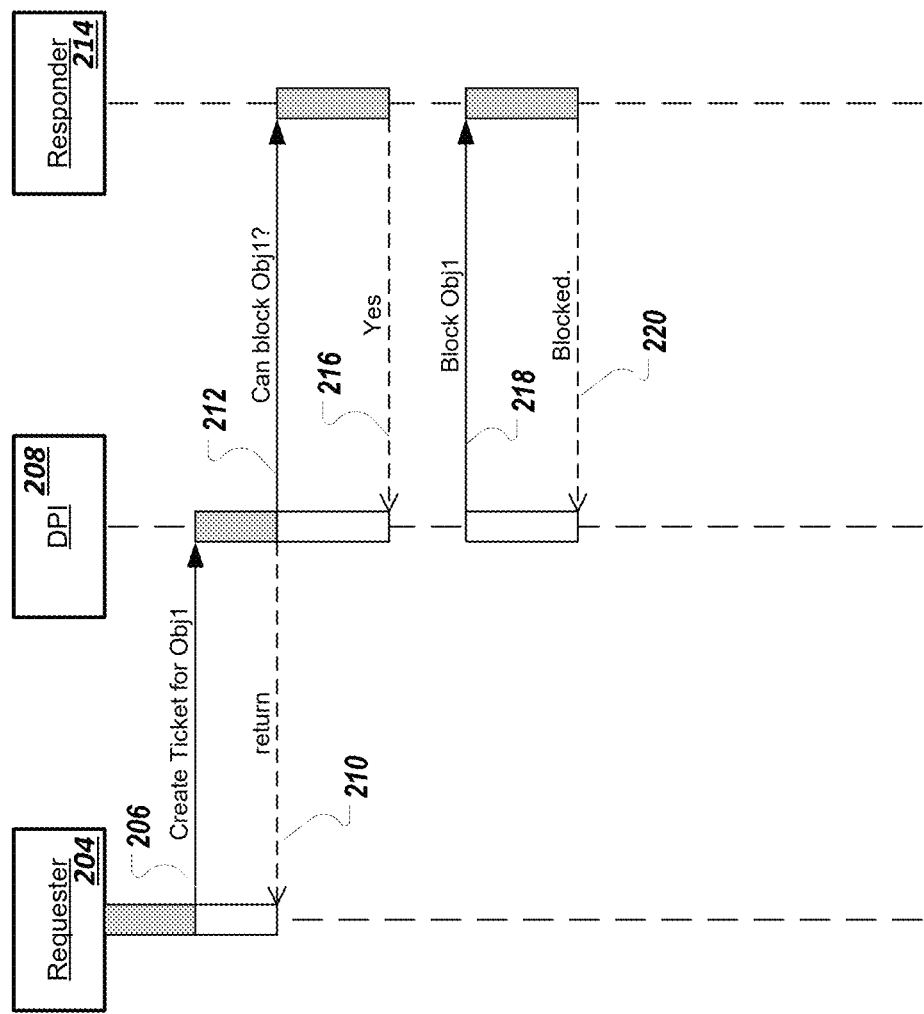
FIGS. 2-3 are swim lane diagrams of example integrated end of purpose protocol processes.

FIG. 2 is a swim lane diagram of an example integrated end of purpose protocol process 200. A requester 204 can send a request 206 to a DPI service 208 to create a ticket for an Obj1 object for an iEoP protocol. The DPI service 208 can send a response 210 to the requester 204 that indicates a status of creating the requested ticket. The response 210 can indicate whether the Obj1 object is accepted for the ticket. The Obj1 object might not be accepted for a current ticket if the Obj1 object was included in (and may be currently being handled in) a different recent ticket, for example. More complicated scenarios are also described in the above-mentioned U.S. patent application Ser. No. 17/457,797.

In cases where the ticket is successfully created, the DPI service 208 can send an inquiry 212 to a responder 214 that asks the responder 214 to determine and to respond regarding whether the responder 214 can block the Obj1 object. Although only one responder is shown, the DPI service 208 can send a same type of inquiry to other responders in the landscape. In the current example, the requester 204 can also be a responder in this example. The responder 214 sends a response 216 of Yes (e.g., indicating "can-block") in response to the inquiry 212.

The DPI service 208 can gather the response 216 and other responses (e.g., from other responders) and can determine whether all responders can block the Obj1 object. In response to determining that all responders can block the Obj1 object, the DPI service 208 can send a block instruction 218 to the responder 214 (and to other responders) requesting local blocking of the Obj1 object. The responder 214 can block the Obj1 object in response to receiving the block instruction 218 and can send a block operation status 220 (e.g., blocking success, blocking failure) to the DPI service 208. Accordingly, the responder 214, and other responders, can eventually block an object such as the Obj1 object after creation of an iEoP ticket in response to a ticket creation request from a requester, such as the requester 204.

Figure 3:
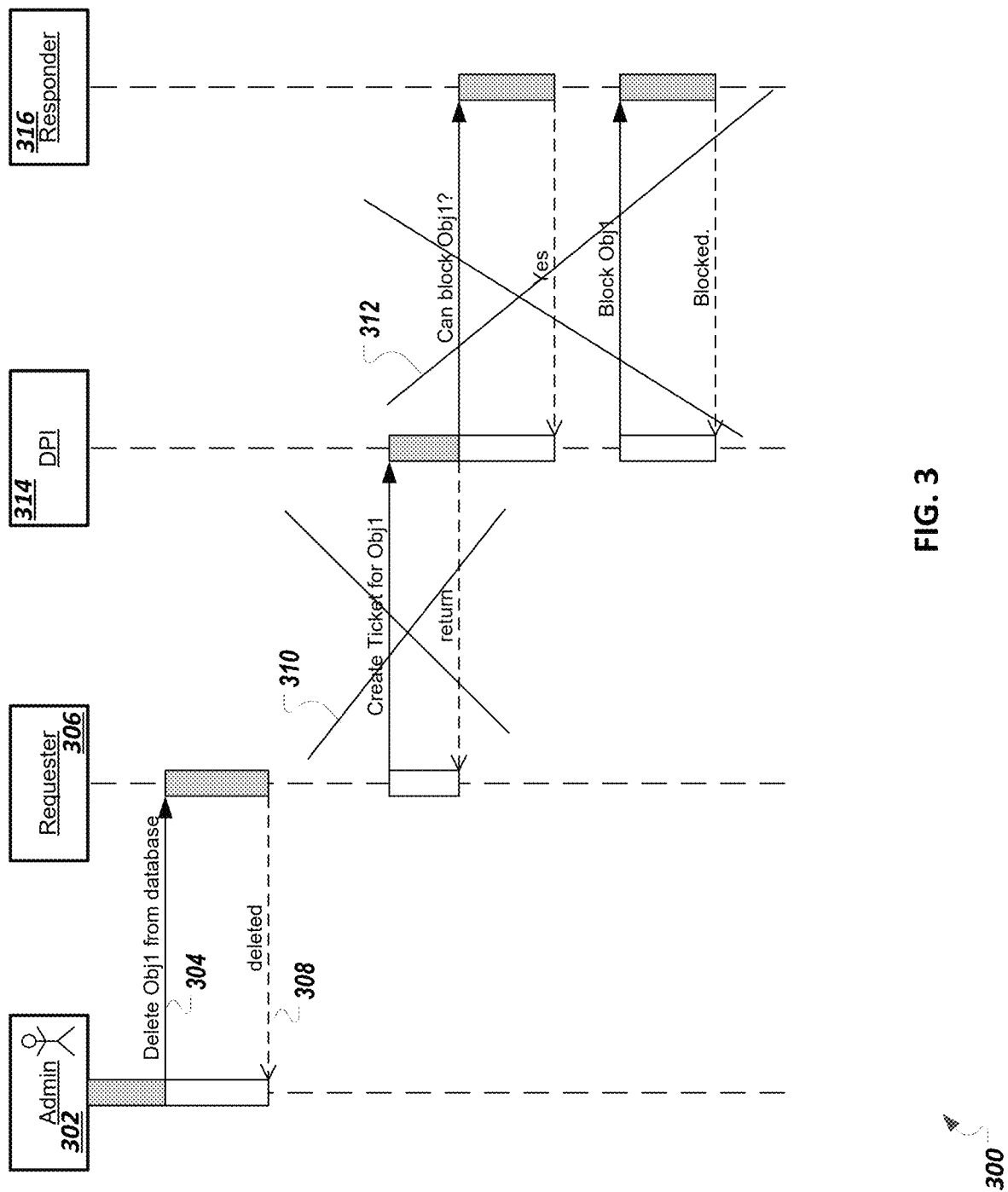

FIG. 3 is a swim lane diagram of an example integrated end of purpose protocol process 300. As described above, in some cases, an object may be deleted from a requester outside of an iEoP protocol, for example. For instance, an administrator 302 can perform or request a delete action 304 regarding an Obj1 object in a requester 306. The administrator 302 can receive or view a status 308 regarding the deletion. As an example, the administrator may receive or be aware of a request from a data subject regarding a right to be forgotten and the administrator may have mistakenly and manually deleted the object from a database.

As described above, once an object is deleted from a requester outside of the iEoP protocol, the object may never be deleted from a responder (at least through operation of the iEoP protocol). For instance and as illustrated by a cross-out symbol 310, the requester 306, once the Obj1 object has been deleted, will not initiate creation of a ticket for the object since that object is no longer stored in the requester 306. Likewise, and as illustrated by a cross-out symbol 312, a DPI service 314 will never receive, from the requester 306, the ticket creation request for the object, and therefore will not send out can-block inquiries for the object to a responder 316 or other responders. However, the solution described herein within respect to FIGS. 1 and 4-9 can solve this problem so that the object is at some point deleted from the responder 316.

Figure 4:
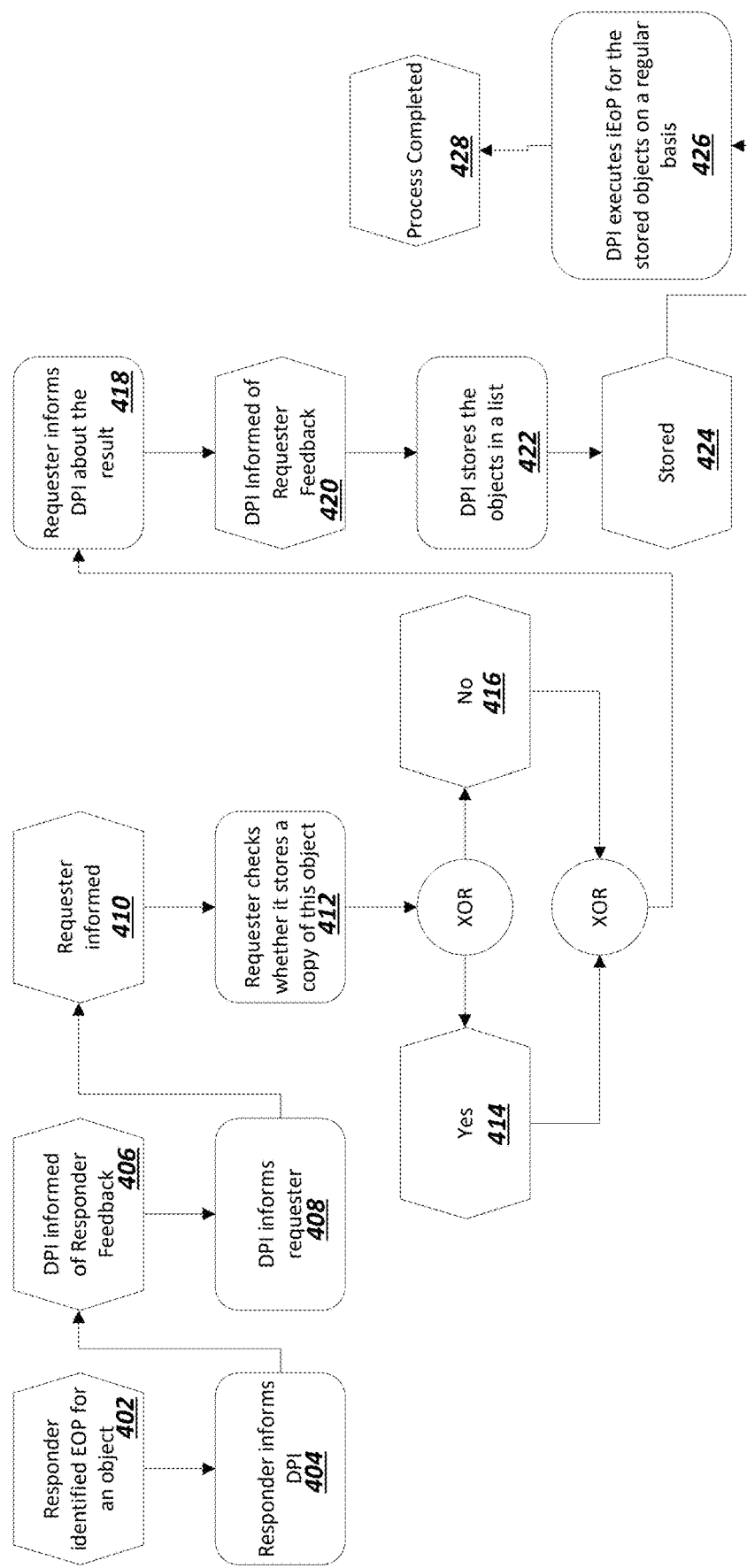
FIGS. 4-7 are flowcharts of example processes.

FIG. 4 is a flowchart of an example process 400. The process 400 begins with a state 402 of an application that is configured as a responder for an object type (e.g., "the responder") having identified EoP for an object. The process 400 (as well as other processes described below with respect to FIGS. 5-7) are generally described with respect to the iEoP protocol, but similar processes can be performed for the APD protocol. For example, the responder can determine that a purpose can be disassociated from an object. The responder can be configured to execute an EoP check (or an APD check) although the responder is not set up as requester. The responder can be configured to periodically check objects included in the responder, for example.

At 404, the responder informs a DPI service that the responder has identified EOP for the object, resulting in a state 406 of DPI being informed of the responder feedback (e.g., of the EOP of the object in the responder). In other words, the responder informs the DPI service, that from the perspective of the responder, the object can be blocked. The DPI service can provide a dedicated API for responders to invoke to inform the DPI service about objects that can be blocked by responders, for example. The responder can invoke this provided API.

At 408, the DPI service informs an application that is configured as a requester for the object type (e.g., "the requester") that EOP has been reached for the object in the responder, resulting in a state 410 of the requester being informed of the EOP of the object in the responder. The DPI service can inform the requester using a work package mechanism and work package type specific to querying requesters about blockable objects in responders. As another example, the DPI service can inform the requester in response to the requester periodically invoking an API provided by the DPI service. Although one requester is shown, the DPI service can similarly inform other requesters, if the landscape has multiple requesters for a given object type.

At 412, in response to being informed by the DPI service of the EOP status of the object in the responder, the requester checks whether the requester stores a copy of the object. The check can result in either a yes state 414 (that the requester stores a copy of the object) or a no state 416 (that the requester does not store a copy of the object). If in the no state 416, as described above with respect to FIG. 3, an administrator of the requester may have deleted the object outside of an integrated end of purpose protocol. As another example, one or more application or system misconfigurations may have led to the object no longer being stored at (or in some cases, never received at) the requester. For instance, a responder may create an object, but a misconfiguration in the responder and/or in a replication engine may result in a situation in which the object is never replicated to the requester (or other requesters). In some instances, perhaps the object is not replicated at all or is only replicated to other responders. As yet another example, a key mapping component may fail or be misconfigured which may prevent one or more objects from participating in an iEoP protocol.

If it is determined that the result is the yes state 416, if the requester has a copy of the object, then at some later point in time the requester can determine to create an iEoP ticket (which can eventually lead to the object being blocked in the requester and the responder once an iEoP voting consensus has been reached in the landscape regarding aligned end of purpose for the object).

At 418, the requester informs the DPI service about the result of the check, resulting in a state 420 of the DPI service being informed of the requester feedback. In some cases, the requester may inform the DPI service about objects associated with the no state 416 (e.g., that the requester is not familiar with certain object identifiers) but not objects associated with the yes state 414. The DPI service can assume the yes state 414 for objects for which no response has been received, for example. Various types of processing may occur after the DPI service has been informed of the result of the check(s) by requester(s), as described below with respect to steps 422 and 426 and also with respect to FIGS. 5 to 7 for additional examples.

At 422, in response to the DPI service being informed about result(s) of requester feedback (e.g., regarding whether requester(s) are not familiar with certain objects that are blockable by responder(s)), the DPI service can store, for example in a list, objects that are blockable by a responder but are not stored in a requester. A state 424 of objects being stored can result from the DPI service managing such an object list.

At 426, the DPI service initiates the iEoP protocol for the stored objects on a regular basis, resulting in process-completed state 428 (e.g., for a current run of those objects). For example, the DPI service can create iEoP tickets for the stored objects. An iEoP ticket can eventually result in the object being deleted from the responder. For instance, the requester will not raise an iEoP veto vote for the object, so will not prevent the object from being blocked. If no other iEoP voters provide a veto vote for an object blockable by the responder, the performance of the iEoP protocol can result in a consensus vote that triggers a block instruction being sent by the DPI service and received and acted on by the responder.

In some cases, the DPI service stores a list of orphaned objects and creates tickets, on a regular basis (or in response to an administrator request), for objects included in the list of orphaned objects. For instance, as described below with respect to FIG. 5, the DPI service can create work packages of objects and send the work packages to responders. In some cases, the DPI service uses a DPI protocol result from a ticket for an object to adjust processing for the object. For instance, for a given object, if the result of ticket processing for an object leads to a result of the object not being blocked, the DPI service may exclude that object from future work package(s) sent to responders (e.g., so as to not ask responders again about an orphaned object for which the DPI service is already aware). As another example, for a particular object in the orphaned object list, if all responders respond with an indication that they are not familiar with the object, the DPI service can remove the object from the orphaned object list.

In some cases, instead of the DPI service creating tickets for the stored objects, a veto service or another proxy might take over the responsibility for the stored objects and create tickets for the stored objects (e.g., on a regular basis). As another example, the requester, in the state 410 of being informed of object(s) blockable by the responder, may create an iEoP ticket if the object could be blocked from the perspective of the requester. That is, if the requester recognizes (e.g., stores) the object, and determines that the object can be blocked, the requester can create an iEoP ticket (e.g., rather than having the DPI service or another service create the ticket). If the requester recognizes (e.g., stores) the object but determines that the object cannot be blocked, the requester does not create an iEoP ticket for the object at that point in time. In some cases, the requester can be configured to create an iEoP ticket for an object that is not recognized (e.g., not stored) by the requester. Alternative approaches are discussed below that do not involve responders initiating DPI processing (e.g., at 404). For example, having responders initiate processing may result in similar drawbacks as described above regarding approaches that have all responders configured as requesters.

Figure 5:
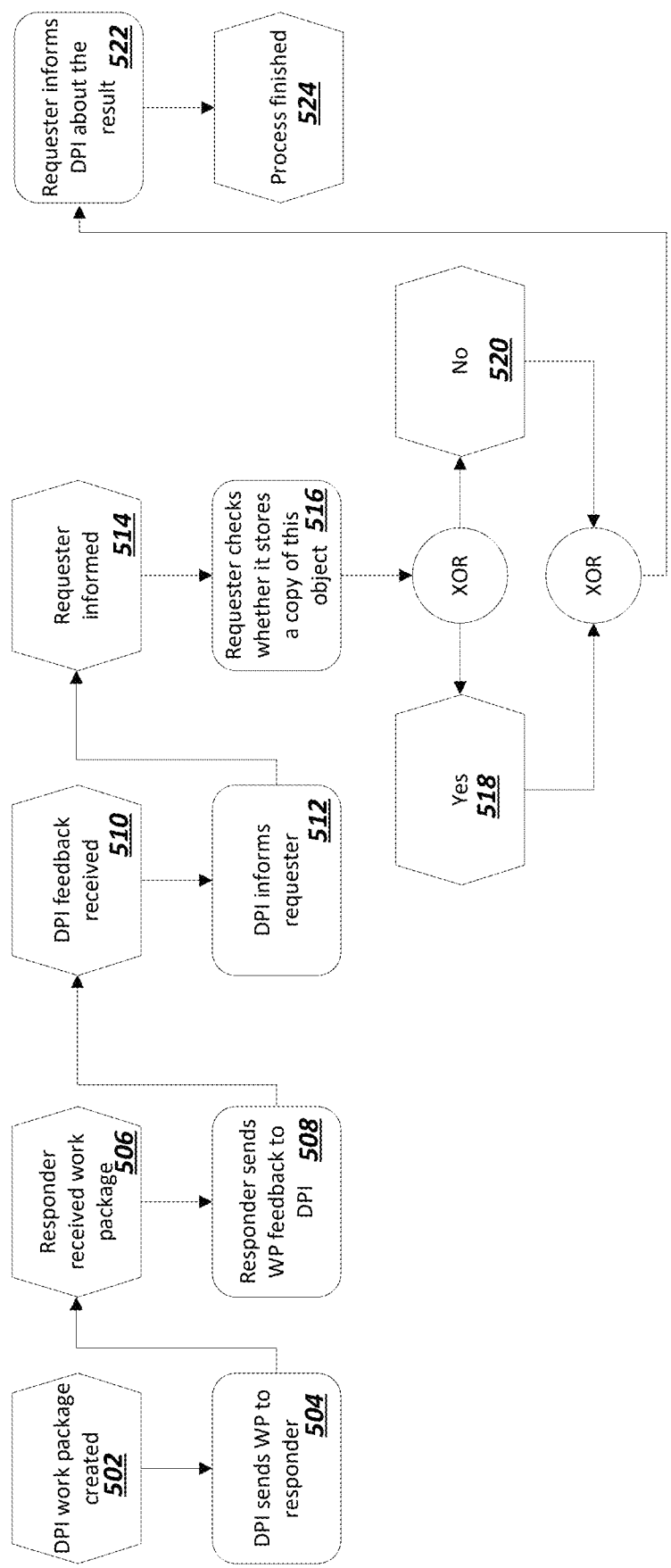

FIG. 5 is a flowchart of an example process 500. Although described for the iEoP protocol, the process 500 can be similarly adapted for the APD protocol, where can-block, etc., is replaced with can-disassociate-purpose, etc.). The process 500 begins with a state 502 of a work package (WP) having been created by a DPI service. Rather than the responder checking on its own whether objects can be blocked (e.g. as described above with respect to FIG. 4), the DPI service can create a work package for a responder to check whether objects can be blocked by the responder on a periodic (e.g., yearly, monthly) basis, for example. Based on the DPI service not knowing exactly which objects are stored in which responders, the work package can be created with a wildcard (e.g., "*") setting rather than a specific list of objects. In some cases, the work package may include other parameters, such as a created-before parameter, so that, for example, objects that are processed in response to the work package are at least a certain age (e.g., created at least one year ago). As another example, a last-processed parameter can be included so that object that are processed in response to the work package do not include objects that have been processed in a certain recent timeframe (e.g., the past six months).

In some cases, the work package may include a timeout parameter that may be higher than a default timeout setting for other work packages. For instance, the wildcard character may result in a responder processing a substantial number of objects, so the higher timeout can increase a likelihood that the responder can process the work package before the timeout occurs.

In some implementations, the DPI service can check registration information for the responder to determine whether to create a work package for the responder. For instance, based on information received during registration, some responders can be configured to receive periodic work packages from the DPI service whereas other responders can be configured to not receive such periodic work packages.

At 504, the DPI service sends the work package to a responder, resulting in a state 506 of the responder having received the work package.

At 508, the responder processes the work package and sends work package feedback to the DPI service regarding objects that can be blocked by the responder, resulting in a state 510 of the DPI service having received the work package feedback from the responder. In some cases, the responder also includes in the work package feedback a list of objects that cannot be blocked along with a processing estimation (e.g., minimum remaining processing time for iEoP or minimum remaining association time for APD). The DPI service can use the processing estimation for evaluation/tailoring of iEoP/APD protocol configurations.

At 512, the DPI service informs the requester of objects that can be blocked by a responder, resulting in a state 514 of the requester being informed of objects blockable by responder(s). Although one requester is shown, the DPI service can similarly inform other requesters, if the landscape has multiple requesters for a given object type. Informing the requester can occur as described above with respect to FIG. 4.

At 516, for a given object, the requester checks whether it stores a copy of the object, resulting in either a yes state 518 (e.g., the requester has a copy of the object) or a no state 520 (e.g., the requester does not have a copy of the object).

At 522, the requester informs the DPI service of the result of the check, for each object, resulting in a state 524 of completion of the responder/requester feedback gathering process. Further action can be taken (e.g., ticket creation, etc.), as described above with respect to FIG. 4 or as described below with respect to FIGS. 6 and 7, for any objects that are blockable by a responder but not stored by a requester.

Figure 6:
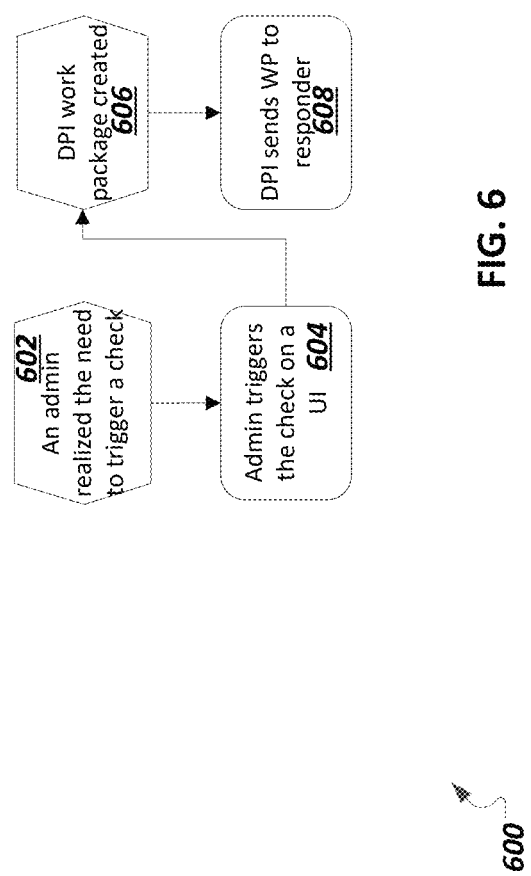

FIG. 6 illustrates an example process 600. The process 600 begins with a state 602 in which an administrator has realized a need to trigger a check for object(s) that may be blockable by responders but which are not stored by any requester. For example, the administrator may observe or be aware of other inconsistencies that have been found in the landscape and the administrator may wish to perform the check to look for "forgotten" objects in the landscape. As another example, the administrator (or the customer of the DPI service in general) may wish to have control over when the check is performed (e.g., rather than automatic checking). The administrator may wish to manually trigger the check at a time of low overall system load, for example, to avoid a situation where an automatic check is performed during a period of high system load.

At 604, the administrator triggers the check on a user interface that is connected to the DPI service, resulting in a request being sent to the DPI service to create a work package and the DPI service creating the requested work package (e.g., as described above with respect to creation of the state 502). Accordingly, a state 606 of the DPI work package being created can be reached. At 608, the DPI services sends the work package to at least one responder. The process 600 can continue as described above for step 504 of the process 500.

Figure 7:
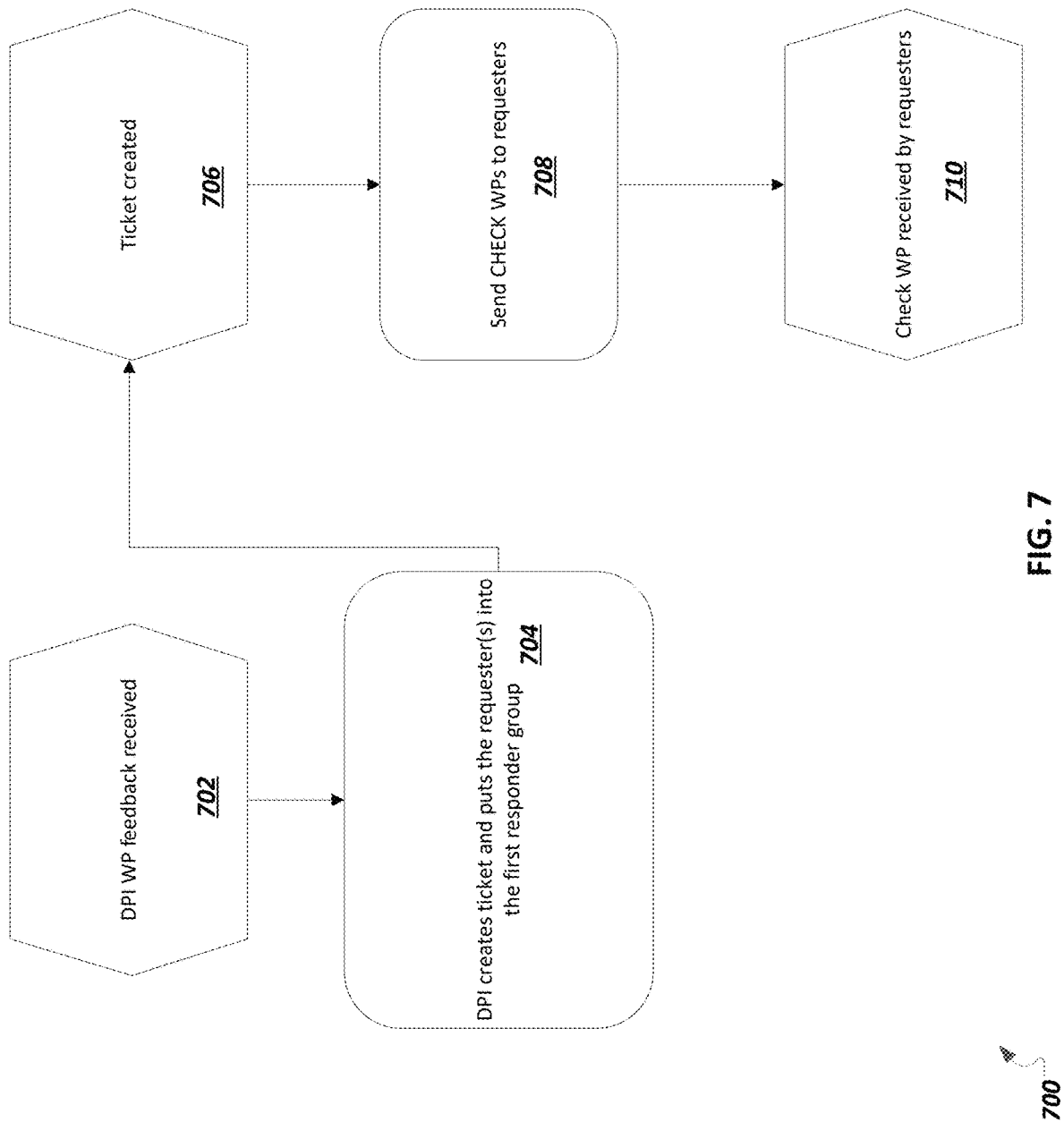

FIG. 7 illustrates an example process 700. The process 700 begins with a state 702 of the DPI service having receive DPI work package feedback from at least one responder (e.g., as described above for the state 510 of the process 500). At 704, instead of informing the requester of the DPI work package feedback as done for step 512 of the process 500, the DPI service automatically creates a ticket for the object(s) in the DPI work package feedback (e.g., objects that are blockable by the responder(s)), resulting in a state 706 of the ticket being created.

The DPI service can use responder groups to configure processing of the created ticket and place one or more requesters in a first responder group (e.g., with responders being placed into later responder group(s)). At 708, the DPI service can send a check work package to the requester(s) in the first responder group, resulting in a state 710 of the check work package being received by the requester(s), with resultant iEoP voting by the requesters. Accordingly, if a requester stores and still needs to use the object, the responders in the later responder groups do not need to participate in the processing of the ticket (e.g., because the requester in the earlier responder group providing a veto vote preempts such processing, and the check work package will not be sent to the responders in the later responder groups). If the requester has no reason to provide a veto vote (e.g., the requester either does not recognize the object or no longer needs the object), the responders in the later responder groups can be asked if the object is blockable (e.g., the check work package can be sent to the responders). If no voters (e.g., requesters or responders) need the object, the blocking of the object can commence as part of the iEoP protocol processing. Accordingly, object blocking of forgotten objects can eventually occur, without requiring any requesters to implement any additional functionality beyond normal participation in the iEoP protocol (e.g., when requesters also participate as responders in the protocol).

Figure 8:
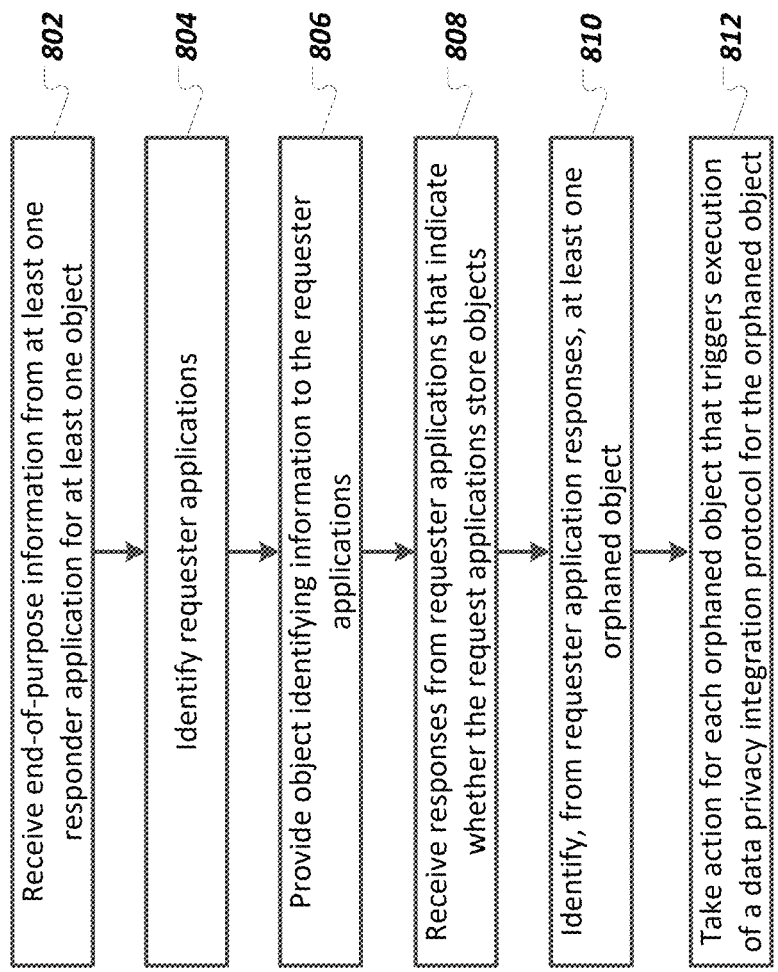
FIG. 8 is a flowchart of an example method for handling orphaned objects in data privacy integration protocols.

FIG. 8 is a flowchart of an example method 800 for handling orphaned objects in data privacy integration protocols. It will be understood that method 800 and related methods may be performed, for example, by any suitable system, environment, software, and hardware, or a combination of systems, environments, software, and hardware, as appropriate. For example, one or more of a client, a server, or other computing device can be used to execute method 800 and related methods and obtain any data from the memory of a client, the server, or the other computing device. In some implementations, the method 800 and related methods are executed by one or more components of the system 100 described above with respect to FIG. 1. For example, the method 800 and related methods can be executed by the server 102 of FIG. 1.

At 802, end-of-purpose information for at least one object is received from at least one responder application that participates in a data privacy integration protocol. Each responder application can respond to data privacy integration protocol commands for executions of a data privacy integration protocol requested by a requester application without initiating the executions of the data privacy integration protocol. The data privacy integration protocol can be, for example, an integrated end of purpose protocol and the end-of-purpose information for an object for a responder application can indicate whether the responder application can block the object. As another example, the data privacy integration protocol can be an aligned purpose disassociation protocol and the end-of-purpose information for an object for a responder application can indicate whether the responder application can disassociate a purpose from the object.

In some cases, each responder application determines, internally, to send the end-of-purpose information (e.g., periodically, in response to an event, or based on some other condition). In some cases, an instruction may have been previously sent to responder applications that requests each responder application to determine end-of-purpose information for the at least one object. The instruction may be automatically sent to the at least one responder application on a periodic basis or in response to receiving an administrator request to send the instruction. The instruction can include a wildcard parameter that is interpreted by a responder application as corresponding to all objects stored by the responder application. In some cases the instruction is sent to some but not all responders. For instance, a determination can be made, based on registration information for a first responder application and a second responder application, to send the instruction to the first responder application and to not send the instruction to the second responder application.

At 804, requester applications that are configured to initiate executions of the data privacy integration protocol are identified for each object.

At 806, identifying information is provided for each object to requester applications in a message to the requester application that requests the requester application to determine whether the requester application currently stores the object.

At 808, a response to the message is received for each object, from requester applications, that indicates whether the requester application currently stores the object.

At 810, at least one orphaned object is identified from information in responses received from requester applications for which a responder application has provided end-of-purpose information but for which no requester application currently stores the object. Orphaned objects can include objects that were deleted from a requester application outside of the data privacy integration protocol. As another example, orphaned objects can include objects for which replication of the object to a requester application failed to occur.

At 812, action is taken for each orphaned object of the at least one orphaned object that triggers an execution of the data privacy integration protocol for the orphaned object. Taking action for an orphaned object can include creating a ticket that includes the orphaned object for initiating the data privacy integration protocol and executing the data privacy integration protocol for the orphaned object in response to creation of the ticket. Executing the data privacy integration protocol for the orphaned object can result in blocking of the orphaned object in the responder application that provided end-of-purpose information for the orphaned object, when the protocol is the integrated end of purpose protocol. As another example, executing the data privacy integration protocol for the orphaned object can result in a first purpose being disassociated from the orphaned object in the responder application that provided end-of-purpose information for the orphaned object, when the protocol is the aligned purpose disassociation protocol. In some cases, taking action for an orphaned object can include receiving (and processing) a data privacy integration protocol ticket that includes the orphaned object from a first requester application (e.g., where the first requester application creates the data privacy integration protocol ticket in response to receiving the message and determining that the first requester application does not store the orphaned object).

In some cases, the message is not sent to requester applications in response to receiving end-of-purpose information from responder applications. Rather, a ticket can be created for the data privacy integration protocol that includes the first object. The data privacy integration protocol can be executed in response to creating the ticket, where executing the data privacy integration protocol can include sending a data privacy integration protocol instruction to the requester applications (e.g., by using a first responder group) and sending the data privacy integration protocol instruction to the at least one responder application (e.g., using later responder groups) only if each requester application has reached end-of-purpose for the first object.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

In view of the above described implementations of subject matter this application discloses the following list of examples, wherein one feature of an example in isolation or more than one feature of said example taken in combination and, optionally, in combination with one or more features of one or more further examples are further examples also falling within the disclosure of this application.

EXAMPLES

Example 1. A computer-implemented method comprising:
receiving, from at least one responder application that participates in a data privacy integration protocol, endof-purpose information for at least one object, wherein the at least one responder application responds to data privacy integration protocol commands for executions of a data privacy integration protocol requested by a requester application without initiating the executions of the data privacy integration protocol;

identifying, for each object of the at least one object, requester applications that are configured to initiate executions of the data privacy integration protocol for the object;

providing, for each object of the at least one object, identifying information for the object to each requester application of the requester applications in a message to the requester application that requests the requester application to determine whether the requester application currently stores the object;

receiving, as received responses, for each object of the at least one object and from each requester application, a response to the message that indicates whether the requester application currently stores the object;

identifying, from information in the received responses from the requester applications, at least one orphaned object for which a responder application has provided end-of-purpose information but for which no requester application currently stores the object; and taking action for each orphaned object of the at least one orphaned object that triggers an execution of the data privacy integration protocol for the orphaned object.

Example 2. The computer-implemented method of Example 1, wherein the data privacy integration protocol is an integrated end of purpose protocol, and the end-of-purpose information for an object for a responder application indicates whether the responder application can block the object.

Example 3. The computer-implemented method of any of the preceding examples, wherein the data privacy integration protocol is an aligned purpose disassociation protocol, and the end-of-purpose information for an object for a responder application indicates whether the responder application can disassociate a purpose from the object.

Example 4. The computer-implemented method of any of the preceding examples, wherein the at least one orphaned object includes a first object that was deleted from a first requester application outside of the data privacy integration protocol.

Example 5. The computer-implemented method of any of the preceding examples, wherein the at least one orphaned object includes a first object for which replication of the first object to a first requester application failed to occur.

Example 6. The computer-implemented method of any of the preceding examples, wherein taking action for an orphaned object comprises creating a ticket that includes the orphaned object for initiating the data privacy integration protocol and executing the data privacy integration protocol for the orphaned object in response to creation of the ticket.

Example 7. The computer-implemented method of any of the preceding examples, wherein executing the data privacy integration protocol for the orphaned object results in blocking of the orphaned object in the responder application that provided end-of-purpose information for the orphaned object.

Example 8. The computer-implemented method of any of the preceding examples, wherein executing the data privacy integration protocol for the orphaned object results in a first purpose being disassociated from the orphaned object in the responder application that provided end-of-purpose information for the orphaned object.

Example 9. The computer-implemented method of any of the preceding examples, wherein taking action for an orphaned object comprises receiving a data privacy integration protocol ticket that includes the orphaned object from a first requester application, and wherein the first requester application creates the data privacy integration protocol ticket in response to receiving the message and determining that the first requester application does not store the orphaned object.

Example 10. The computer-implemented method of any of the preceding examples, further comprising, before receiving the end-of-purpose information, sending, to the at least one responder application, an instruction that requests each responder application to determine end-of-purpose information for the at least one object.

Example 11. The computer-implemented method of any of the preceding examples, wherein the instruction includes a wildcard parameter that is interpreted by a responder application as corresponding to all objects stored by the responder application.

Example 12. The computer-implemented method of any of the preceding examples, further comprising determining, based on registration information for a first responder application and a second responder application, to send the instruction to the first responder application and to not send the instruction to the second responder application.

Example 13. The computer-implemented method of any of the preceding examples, wherein the instruction is automatically sent to the at least one responder application on a periodic basis.

Example 14. The computer-implemented method of any of the preceding examples, wherein the instruction is sent to the at least one responder application in response to receiving an administrator request to send the instruction.

Example 15. The computer-implemented method of any of the preceding examples, wherein the end-of-purpose information is sent by the at least one responder application in response to each responder application determining to generate and send the end-of-purpose information.

Example 16. The computer-implemented method of any of the preceding examples, further comprising, in response to receiving first end-of-purpose information from a first responder application for a first object and instead of sending the message to requester applications:

creating a ticket, for the data privacy integration protocol, that includes the first object; and executing the data privacy integration protocol in response to creating the ticket, wherein executing the data privacy integration protocol comprises sending a data privacy integration protocol instruction to the requester applications and sending the data privacy integration protocol instruction to the at least one responder application only if each requester application has reached end-of-purpose for the first object.

Example 17. A system comprising:

one or more computers; and a computer-readable medium coupled to the one or more computers having instructions stored thereon which, when executed by the one or more computers, cause the one or more computers to perform operations comprising:

receiving, from at least one responder application that participates in a data privacy integration protocol, end-of-purpose information for at least one object, wherein the at least one responder application responds to data privacy integration protocol commands for executions of a data privacy integration protocol requested by a requester application without initiating the executions of the data privacy integration protocol;

identifying, for each object of the at least one object, requester applications that are configured to initiate executions of the data privacy integration protocol for the object;

providing, for each object of the at least one object, identifying information for the object to each requester application of the requester applications in a message to the requester application that requests the requester application to determine whether the requester application currently stores the object;

receiving, as received responses, for each object of the at least one object and from each requester application, a response to the message that indicates whether the requester application currently stores the object;

identifying, from information in the received responses from the requester applications, at least one orphaned object for which a responder application has provided end-of-purpose information but for which no requester application currently stores the object; and taking action for each orphaned object of the at least one orphaned object that triggers an execution of the data privacy integration protocol for the orphaned object.

Example 18. The system of Example 17, wherein the data privacy integration protocol is an integrated end of purpose protocol, and the end-of-purpose information for an object for a responder application indicates whether the responder application can block the object.

Example 19. A computer program product encoded on a non-transitory storage medium, the product comprising non-transitory, computer readable instructions for causing one or more processors to perform operations comprising:

receiving, from at least one responder application that participates in a data privacy integration protocol, end-of-purpose information for at least one object, wherein the at least one responder application responds to data privacy integration protocol commands for executions of a data privacy integration protocol requested by a requester application without initiating the executions of the data privacy integration protocol;

identifying, for each object of the at least one object, requester applications that are configured to initiate executions of the data privacy integration protocol for the object;

providing, for each object of the at least one object, identifying information for the object to each requester application of the requester applications in a message to the requester application that requests the requester application to determine whether the requester application currently stores the object;

receiving, as received responses, for each object of the at least one object and from each requester application, a response to the message that indicates whether the requester application currently stores the object;

identifying, from information in the received responses from the requester applications, at least one orphaned object for which a responder application has provided end-of-purpose information but for which no requester application currently stores the object; and taking action for each orphaned object of the at least one orphaned object that triggers an execution of the data privacy integration protocol for the orphaned object.

Example 20. The computer-readable medium of Example 19, wherein the data privacy integration protocol is an integrated end of purpose protocol, and the end-of-purpose information for an object for a responder application indicates whether the responder application can block the object.

What is claimed is:

1. A computer-implemented method comprising:

receiving, from at least one responder application that participates in a data privacy integration protocol, end-of-purpose information for at least one object, wherein the at least one responder application responds to data privacy integration protocol commands for executions of a data privacy integration protocol requested by a requester application without initiating the executions of the data privacy integration protocol;

identifying, for each object of the at least one object, requester applications that are configured to initiate executions of the data privacy integration protocol for the object;

providing, for each object of the at least one object, identifying information for the object to each requester application of the requester applications in a message to the requester application that requests the requester application to determine whether the requester application currently stores the object;

receiving, as received responses, for each object of the at least one object and from each requester application, a response to the message that indicates whether the requester application currently stores the object;

identifying, from information in the received responses from the requester applications, at least one orphaned object for which a responder application has provided end-of-purpose information but for which no requester application currently stores the object; and taking action for each orphaned object of the at least one orphaned object that triggers an execution of the data privacy integration protocol for the orphaned object.

2. The computer-implemented method of claim 1, wherein the data privacy integration protocol is an integrated end of purpose protocol, and the end-of-purpose information for an object for a responder application indicates whether the responder application can block the object.

3. The computer-implemented method of claim 1, wherein the data privacy integration protocol is an aligned purpose disassociation protocol, and the end-of-purpose information for an object for a responder application indicates whether the responder application can disassociate a purpose from the object.

4. The computer-implemented method of claim 1, wherein the at least one orphaned object includes a first object that was deleted from a first requester application outside of the data privacy integration protocol.

5. The computer-implemented method of claim 1, wherein the at least one orphaned object includes a first object for which replication of the first object to a first requester application failed to occur.

6. The computer-implemented method of claim 1, wherein taking action for an orphaned object comprises creating a ticket that includes the orphaned object for initiating the data privacy integration protocol and executing the data privacy integration protocol for the orphaned object in response to creation of the ticket.

7. The computer-implemented method of claim 6, wherein executing the data privacy integration protocol for the orphaned object results in blocking of the orphaned object in the responder application that provided end-of-purpose information for the orphaned object.

8. The computer-implemented method of claim 6, wherein executing the data privacy integration protocol for the orphaned object results in a first purpose being disassociated from the orphaned object in the responder application that provided end-of-purpose information for the orphaned object.

9. The computer-implemented method of claim 1, wherein taking action for an orphaned object comprises receiving a data privacy integration protocol ticket that includes the orphaned object from a first requester application, and wherein the first requester application creates the data privacy integration protocol ticket in response to receiving the message and determining that the first requester application does not store the orphaned object.

10. The computer-implemented method of claim 1, further comprising, before receiving the end-of-purpose information, sending, to the at least one responder application, an instruction that requests each responder application to determine end-of-purpose information for the at least one object.

11. The computer-implemented method of claim 10, wherein the instruction includes a wildcard parameter that is interpreted by a responder application as corresponding to all objects stored by the responder application.

12. The computer-implemented method of claim 10, further comprising determining, based on registration information for a first responder application and a second responder application, to send the instruction to the first responder application and to not send the instruction to the second responder application.

13. The computer-implemented method of claim 10, wherein the instruction is automatically sent to the at least one responder application on a periodic basis.

14. The computer-implemented method of claim 10, wherein the instruction is sent to the at least one responder application in response to receiving an administrator request to send the instruction.

15. The computer-implemented method of claim 1, wherein the end-of-purpose information is sent by the at least one responder application in response to each responder application determining to generate and send the end-of-purpose information.

16. The computer-implemented method of claim 1, further comprising, in response to receiving first end-of-purpose information from a first responder application for a first object and instead of sending the message to requester applications:
creating a ticket, for the data privacy integration protocol, that includes the first object; and
executing the data privacy integration protocol in response to creating the ticket, wherein executing the data privacy integration protocol comprises sending a data privacy integration protocol instruction to the requester applications and sending the data privacy integration protocol instruction to the at least one responder application only if each requester application has reached end-of-purpose for the first object.

17. A system comprising:
one or more computers; and
a computer-readable medium coupled to the one or more computers having instructions stored thereon which, when executed by the one or more computers, cause the one or more computers to perform operations comprising:
receiving, from at least one responder application that participates in a data privacy integration protocol, end-of-purpose information for at least one object, wherein the at least one responder application responds to data privacy integration protocol commands for executions of a data privacy integration protocol requested by a requester application without initiating the executions of the data privacy integration protocol;
identifying, for each object of the at least one object, requester applications that are configured to initiate executions of the data privacy integration protocol for the object;
providing, for each object of the at least one object, identifying information for the object to each requester application of the requester applications in a message to the requester application that requests the requester application to determine whether the requester application currently stores the object;
receiving, as received responses, for each object of the at least one object and from each requester application, a response to the message that indicates whether the requester application currently stores the object;
identifying, from information in the received responses from the requester applications, at least one orphaned object for which a responder application has provided end-of-purpose information but for which no requester application currently stores the object; and
taking action for each orphaned object of the at least one orphaned object that triggers an execution of the data privacy integration protocol for the orphaned object.

18. The system of claim 17, wherein the data privacy integration protocol is an integrated end of purpose protocol, and the end-of-purpose information for an object for a responder application indicates whether the responder application can block the object.

19. A computer program product encoded on a non-transitory storage medium, the product comprising non-transitory, computer readable instructions for causing one or more processors to perform operations comprising:
receiving, from at least one responder application that participates in a data privacy integration protocol, end-of-purpose information for at least one object, wherein the at least one responder application responds to data privacy integration protocol commands for executions of a data privacy integration protocol requested by a requester application without initiating the executions of the data privacy integration protocol;
identifying, for each object of the at least one object, requester applications that are configured to initiate executions of the data privacy integration protocol for the object;
providing, for each object of the at least one object, identifying information for the object to each requester application of the requester applications in a message to the requester application that requests the requester application to determine whether the requester application currently stores the object;
receiving, as received responses, for each object of the at least one object and from each requester application, a response to the message that indicates whether the requester application currently stores the object;
identifying, from information in the received responses from the requester applications, at least one orphaned object for which a responder application has provided end-of-purpose information but for which no requester application currently stores the object; and taking action for each orphaned object of the at least one orphaned object that triggers an execution of the data privacy integration protocol for the orphaned object.

20. The computer program product of claim 19, wherein the data privacy integration protocol is an integrated end of purpose protocol, and the end-of-purpose information for an object for a responder application indicates whether the responder application can block the object.

\* \* \* \* \*